(12) United States Patent
Cohen et al.

(10) Patent No.: US 11,449,348 B2
(45) Date of Patent: *Sep. 20, 2022

(54) PRE/POST DEPLOYMENT CUSTOMIZATION

(71) Applicant: Oracle International Corporation, Redwood Shores, CA (US)

(72) Inventors: Ariel Cohen, Foster City, CA (US); Javier Espeche, Foster City, CA (US); Jonathan Lopez Lopez, San Mateo, CA (US); Rajesh Tiwari, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 332 days.

This patent is subject to a terminal disclaimer.

(21) Appl. No.: 16/670,877

(22) Filed: Oct. 31, 2019

(65) Prior Publication Data

US 2020/0065119 A1 Feb. 27, 2020

Related U.S. Application Data

(63) Continuation of application No. 15/647,059, filed on Jul. 11, 2017, now Pat. No. 10,521,243.

(Continued)

(51) Int. Cl.
  *G06F 9/445* (2018.01)
  *G06F 8/71* (2018.01)
  (Continued)

(52) U.S. Cl.
  CPC ............ *G06F 9/44505* (2013.01); *G06F 8/36* (2013.01); *G06F 8/60* (2013.01); *G06F 8/71* (2013.01)

(58) Field of Classification Search
  None
  See application file for complete search history.

(56) References Cited

U.S. PATENT DOCUMENTS

| | | | | |
|---|---|---|---|---|
| 2002/0178254 | A1* | 11/2002 | Brittenham | G06F 9/5027 709/224 |
| 2012/0005646 | A1* | 1/2012 | Manglik | G06F 8/60 717/176 |

(Continued)

OTHER PUBLICATIONS

Bures, "Communication Style Driven Connector Configurations", 2004, Springer-Verlag (Year: 2004).*

(Continued)

*Primary Examiner* — Hossain M Morshed
(74) *Attorney, Agent, or Firm* — Trellis IP Law Group, PC

(57) ABSTRACT

An example system and method facilitates customization of and configuration of a software connector, such as a connector to an Application Programming Interface (API) or web service, in various types of computing environments, including both pre-deployment and post-deployment computing environments. A connectors framework provides a layer of abstraction between connectors maintained in the different environments and a connector editor of an application development system (which may be implemented via a server-side integrated development environment). The connector editor may provide User Interface (UI) functionality, including one or more UI controls for editing or otherwise modifying, customizing, and/or configuring connectors in pre-deployment and/or post deployment environments, which may represent or correspond to different connector and accompanying software development stages.

20 Claims, 9 Drawing Sheets

Related U.S. Application Data

(60) Provisional application No. 62/395,883, filed on Sep. 16, 2016.

(51) Int. Cl.
 *G06F 8/36* (2018.01)
 *G06F 8/60* (2018.01)

(56) References Cited

U.S. PATENT DOCUMENTS

| | | | | |
|---|---|---|---|---|
| 2012/0311157 A1* | 12/2012 | Erickson | | G06F 9/541 |
| | | | | 709/226 |
| 2012/0331519 A1* | 12/2012 | Yu | | G06F 21/12 |
| | | | | 726/1 |
| 2013/0262510 A1* | 10/2013 | Smith | | G06F 16/22 |
| | | | | 707/770 |
| 2014/0130036 A1* | 5/2014 | Gurikar | | G06F 8/61 |
| | | | | 717/176 |
| 2014/0237594 A1* | 8/2014 | Thakadu | | G06F 21/52 |
| | | | | 726/23 |
| 2015/0058833 A1* | 2/2015 | Venkata Naga Ravi | | |
| | | | | G06F 9/44526 |
| | | | | 717/168 |
| 2016/0054992 A1* | 2/2016 | Berg | | G06F 8/71 |
| | | | | 717/169 |
| 2016/0092180 A1* | 3/2016 | Straub | | G06T 1/0007 |
| | | | | 715/762 |
| 2016/0283203 A1* | 9/2016 | Li | | G06F 16/958 |
| 2017/0199752 A1* | 7/2017 | Cao | | G06F 9/45558 |
| 2017/0269911 A1* | 9/2017 | Barsness | | G06F 8/20 |

OTHER PUBLICATIONS

Mikic-Rakic, "Architecture-Level Support for Software Component Deployment in Resource Constrained Environments", 2002, Springer-Verlag (Year: 2002).*

Arshad, "Deployment and Dynamic Reconfiguration Planning for Distributed Software Systems", 2003, IEEE (Year: 2003).*

\* cited by examiner

PRE/POST DEPLOYMENT CUSTOMIZATION

CROSS REFERENCES TO RELATED APPLICATIONS

This application is a continuation of the following application, U.S. patent application Ser. No. 15/647,059, entitled PRE/POST DEPLOYMENT CUSTOMIZATION, filed on Jul. 11, 2017, which claims priority from U.S. Provisional Application Ser. No. 62/395,883, entitled PRE/POST DEPLOYMENT CUSTOMIZATION, filed on Sep. 16, 2016, which is hereby incorporated by reference as if set forth in full in this application for all purposes.

This application is related to the following applications: U.S. Provisional Application Ser. No. 62/395,876, entitled GENERIC-FLAT STRUCTURE REST API EDITOR, filed on Sep. 16, 2016; U.S. application Ser. No. 15/647,082, also entitled GENERIC-FLAT STRUCTURE REST API EDITOR, filed on Jul. 11, 2017; U.S. Provisional Patent Application Ser. No. 62/395,896, entitled CONNECTORS FRAMEWORK, filed on Sep. 16, 2016; and U.S. patent application Ser. No. 15/647,096, also entitled CONNECTORS FRAMEWORK, filed on Jul. 11, 2017, which are hereby incorporated by reference as if set forth in full in this application for all purposes.

BACKGROUND

The present application relates to computing, and more specifically to software and accompanying mechanisms and methods for facilitating reusability and configurability of mechanisms for interfacing steps of a process-based software application with computing resources or operations, as may be provided by web services, Application Programming Interfaces (APIs), and so on.

Systems and methods for facilitating reusability of computing resources, e.g., web services and associated interfacing mechanisms, are used in various demanding applications, including mechanisms for implementing steps of a process-based software application (e.g., as may be described using Business Process Model and Notation (BPMN)) by calling external web services or APIs; implementing website widgets, e.g., shopping carts, and so on. Such applications may demand efficient user friendly mechanisms for enabling developers to define processes (or process steps) of a software application (e.g., a process-based software application) that call external web services or APIs, without needing to substantially alter the processes and associated interfacing mechanisms when deploying the software application to different computing environments.

Conventionally, process-based software application developers or designers may manually code instructions within the process steps to call external computing resources (e.g., corresponding to web services) so as to the meet the needs of a given process step. When the process-based software application is deployed to different computing environments, the developer must often manually alter code in the process-based software application to account for the different computing environments, e.g., differences in called endpoint Uniform Resource Locators (URLs), security parameters (e.g., login credentials and/or associated authentication mechanisms), and so on.

Such manual recoding and redeployment to different environments often not only requires a relatively high-level of technical expertise (including developer and deployment manager expertise), but is often time-consuming, and may require problematic shut-down of a running software application to enable alterations to the software application when changes in the computing environment necessitate such alterations.

SUMMARY

An example system and method facilitates configuring a software connector (e.g., API, web service, etc.) for interfacing resources in different computing environments, e.g., pre-deployment and post-deployment and/or at different connector and associated application development stages. The example method includes employing a connectors framework in communication with a pre-deployment computing environment and a post-deployment computing environment to provide a layer of abstraction to a connector editor of an application development system (e.g., an integrated development environment); receiving a first signal from a user input device associated with the user computer system to configure a first connector prior to deployment, wherein the first connector is maintained in the pre-deployment computing environment; using the connectors framework to determine when the first connector is deployed to the post-deployment environment, and maintaining an association between the first connector and the deployed connector; receiving a second signal from a user input device to configure the deployed connector; and employing the layer of abstraction and the association to facilitate providing user access to one or more User Interface (UI) controls via the application development system and the user computer system in communication therewith, wherein the one or more UI controls enable configuration of the deployed connector in the post-deployment computing environment.

In a more specific embodiment, the example method further includes using the connectors framework to automatically parameterize the first connector with different data depending upon whether the first connector is in a pre-deployment computing environment or represents a deployed connector in a post-deployment computing environment.

The application development system may include a connector editor, UI display screens of which are accessible to a user computer via a browser. The one or more UI display screens include the one or more UI controls. The one or more UI controls provide one or more user options to change connection configurations for a particular connector before and after deployment, in the pre-deployment computing environment and the post-deployment computing environment, respectively.

Accordingly, users, e.g., developers or designers, can now readily change connection configurations when connectors are maintained in different computing environments, e.g., environments that may represent different stages prior to production and after deployment. Various embodiments discussed herein disclose connectors and associated configuration mechanisms that enable highly reusable connectors that may be used in different computing environments with merely a simple configuration change.

A further understanding of the nature and the advantages of particular embodiments disclosed herein may be realized by reference of the remaining portions of the specification and the attached drawings.

DETAILED DESCRIPTION OF EMBODIMENTS

Figure 1:
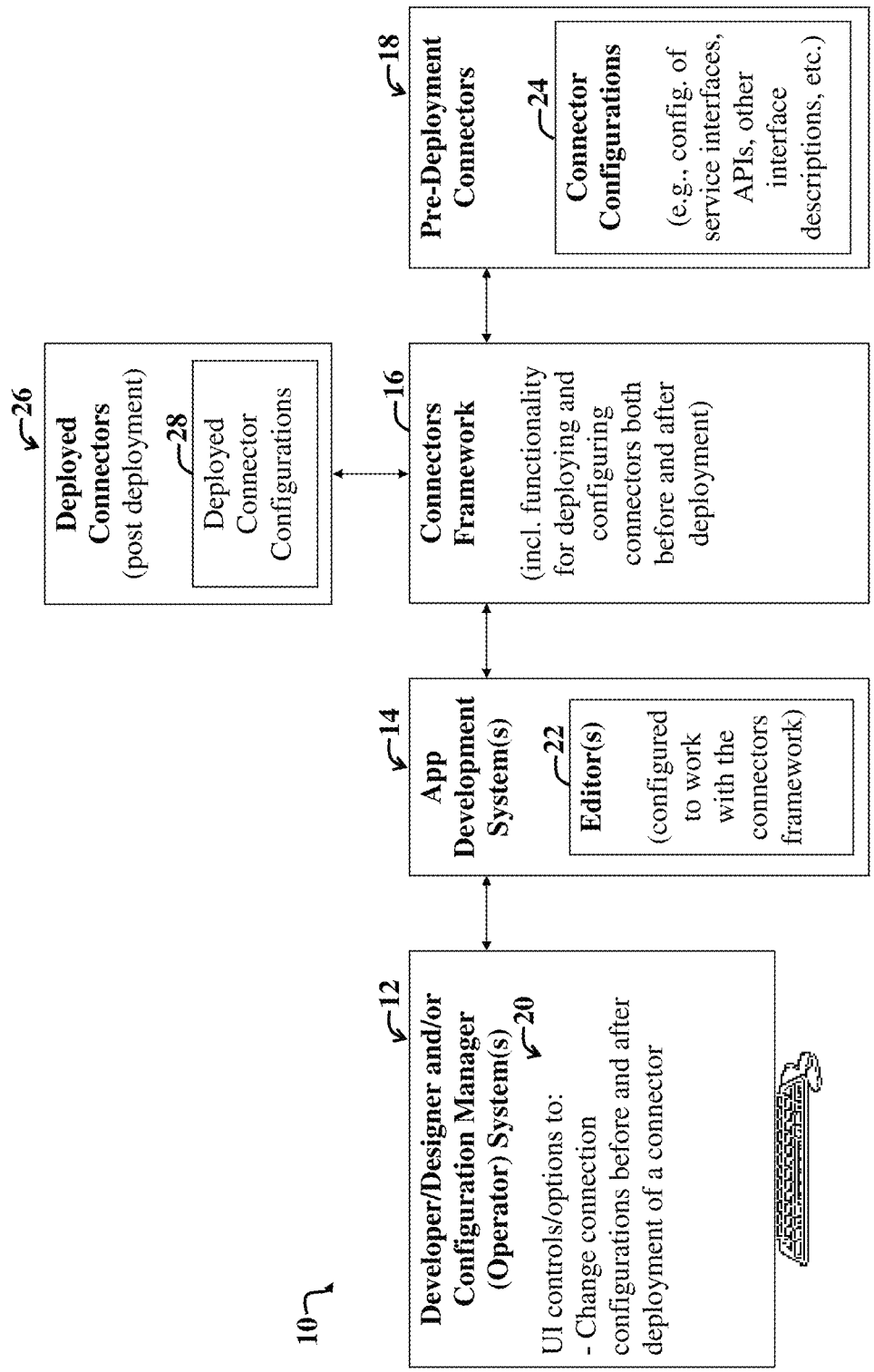
FIG. 1 is a first block diagram illustrating a first example system and accompanying computing environment enabling a user, e.g., a configuration manager, to configure a software connector (e.g., for connecting to an API, web service, etc.) for interfacing different resources of a computing environment, whether or not the connector and associated configuration is maintained in a pre-deployment or post-deployment computing environment.

Conventionally, software developers, configuration managers, deployment managers, and other users of a computing environment may subscribe to certain cloud services to facilitate development, configuration, and deployment of software applications and storage of associated files. A cloud service that is configured for software application or process flow development, management, and/or deployment is called a Process Cloud Service (PCS) herein.

A process cloud service may employ a networked database to store files and other objects used by a given software program being developed. Server-side development environments may be accessible to developers via a browser. The development environments may be backed by the PCS, such that developed software application files are stored in the PCS database.

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on. Examples of computing resources include data and/or software functionality offered by one or more web services, Application Programming Interfaces (APIs), etc.

An enterprise computing environment may be any computing environment used for a business or organization. An example enterprise computing environment includes various computing resources distributed across a network and may further include private and shared content on Intranet Web servers, databases, files on local hard discs or file servers, email systems, document management systems, portals, and so on.

A given software application may include (but not necessarily) constituent software applications or modules (e.g., services, functions, procedures, computing objects, etc.). Accordingly, the term "software application" may also include networked software applications or integrated groups thereof.

Certain embodiments discussed herein are particularly useful for development, deployment, and implementation of process-based software applications. A process-based software application may be any software application definable by one or more sequences of steps, also called process elements or software activities. The terms "process element," "flow element," "software element," and "software process element" may be employed interchangeably herein to refer to any step, e.g., event, activity, gateway, sub-process, and so on. A sequence of steps of a process-based software application may be called a process flow. Process flows are often modeled and illustrated via swim lanes in a User Interface (UI) display screen. Process-based applications are often implemented via composite applications that may leverage different web services for different process steps.

For the purposes of the present discussion, a web service may be any computer code and associated functionality that is adapted to be called by an application or other service or process whose code is stored in a separate location (e.g., on another computer or memory storage location or device) from the web service. Accordingly, the term "service" as used herein is relatively broad and may include remotely accessible APIs and services characterized by Web Services Description Language (WSDL) interfaces, Simple Object Access Protocol (SOAP), REpresentational State Transfer (REST), YAML (Yet Another Markup Language), and/or other types of interfaces.

Generally, web services, also simply called services herein, provide functionality, e.g., capabilities, that may be reused by different applications, processes, or web services (that may be distributed across a network), which access the functionality via a service interface (e.g., WSDL interface) consistent with a description of the web service. A web services model may represent a loosely coupled integration model for allowing flexible integration of various network-distributed applications or processes.

Business process-based software applications are often modeled using Business Process Model and Notation (BPMN). Software development tools for enabling business users, developers, designers, and so on, may provide features for interacting with and/or manipulating BPMN graphical representations of the process-based software application during development of the application.

For the purposes of the present discussion, a software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

For clarity, certain well-known components, such as hard drives, processors, operating systems, power supplies, routers, Internet Service Providers (ISPs), workflow orchestrators, process schedulers, process clouds, business process management systems, and so on, are not necessarily explicitly called out in the figures. However, those skilled in the art with access to the present teachings will know which components to implement and how to implement them to meet the needs of a given implementation.

FIG. 1 is a first block diagram illustrating a first example system 10 and accompanying computing environment enabling a user, e.g., developer or designer, to configure a software connector (e.g., for connecting to an API, web service, etc.) 18, 26 for interfacing different resources of a computing environment (e.g., a process-based software application and a backend database system), whether or not the connector and associated configuration is maintained in a pre-deployment, post-deployment, or a different type of computing environment.

The overall system 10 may represent a networked computing environment, such as a networked enterprise computing environment. Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings.

The example system 10 includes one or more developer computer systems 12 in communication with an application development system 14. The application development system 14 may be implemented via an integrated development environment that includes one or more connector editors 22. The connector editor(s) 22 include code for rendering one or more UI display screens and accompanying controls 20 on the developer computer system(S) 12.

The UI controls 20 provide various user options for developing and manipulating (e.g., editing, configuring, deleting, etc.) connectors 18, 26. Software functionality of the editor(s) 22 backing the UI controls 20 interacts with a connector and abstraction (e.g., simplifying container) provided by the connectors framework 16 to facilitate interactions between the editor(s) 22 and the different connectors 18, 26 of the different computing environments in which they reside.

For the purposes of the present discussion, a layer of abstraction may be any mechanism for providing a simplifying interface or container, such as by selectively hiding or generalizing implementation details or underlying complexity of something, e.g., to facilitate software development and/or intercommunications between software entities, e.g., process steps, external services, etc.

For example, the connectors framework 16 implements functionality for generalizing or reducing exposed complexity (i.e., exposed to the process developer or other user) of interfaces (e.g., as may be described by WADL files or other interface description mechanisms, depending upon the service type) for external services (that the connectors 18, 26 connect to) that are to be called by the process-based software application(s) (developed using the application development systems 14), to thereby facilitate development, configuration, deployment, and use of the process-based software application(s). The terms "layer of abstraction," "abstraction layer," and "abstraction" may be employed interchangeably herein.

Accordingly, the connectors framework 16 represents an example of a layer of abstraction, where the layer is used by connectors 18, 26 that facilitate tying steps of a process-based software application to services or APIs called thereby.

The abstraction may enable a business user to leverage data and/or functionality offered by external web services, without requiring detailed technical knowledge of each type of external web service to call; what interface specification details must be coded into a service step of a process-based software application, and so on. Accordingly, connector development and allocation for use with a process-based software application can be a seamless experience, regardless of connector type (e.g., ICS, SOAP, REST, etc.).

Note that in general, connectors or services expose operations that the user (e.g., developer) can leverage in their process-based software application flow. The user merely picks the operation, and views and assign applicable connector(s) to perform an operation for any given process step, e.g., flow element.

For the purposes of the present discussion, a connectors framework may be any reusable set of data and/or software functionality for implementing one or more functions pertaining to connectors. Accordingly, a connectors framework may represent a type of software framework. Example functions pertaining to connectors include implementing tools to facilitate user construction, configuration, deployment, and use of connectors.

A connector may be any mechanism that facilitates interfacing or otherwise facilitates intercommunications between different software components and/or computing resources. Connectors discussed herein generally represent added functionality over conventional software components used to make web service calls, where the added functionality (as may be implemented using the connectors framework 16) may be visualized as a layer of abstraction that simplifies developer use of external services for implementing steps of process-based software applications.

In the present example embodiment, a first set of one or more pre-deployment connectors 18 and accompanying connector configurations 24 are maintained in or otherwise represent a pre-deployment computing environment, i.e., a computing environment primarily used for software and connector development as opposed to testing, running, or otherwise deploying as deployed connectors 26.

The deployed connectors 26 and accompanying deployed connector configurations 28 are automatically parameterized by the connectors framework 16 and accompanying abstractions to accommodate different data characterizing the different computing environments 18, 26 represented by the different connectors 18, 26.

Figure 2:
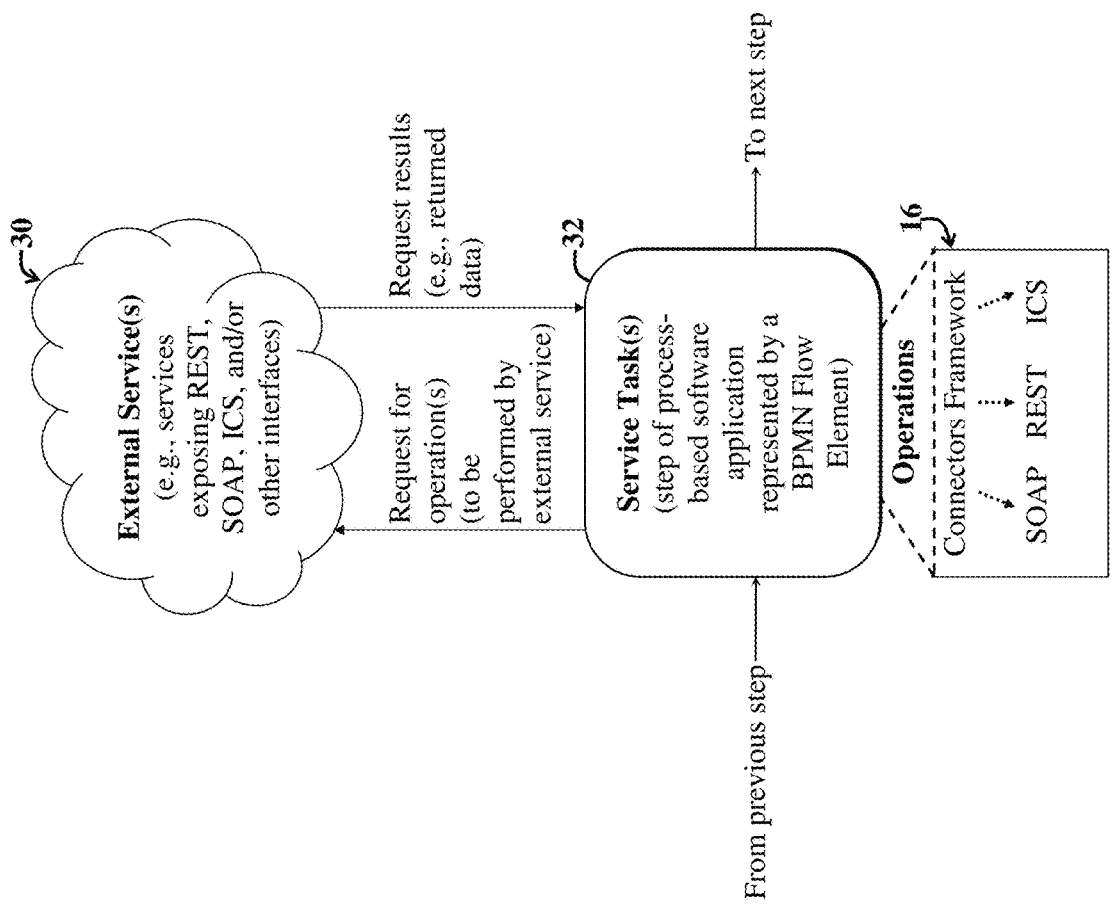
FIG. 2 is a second block diagram illustrating example relationships between a service task corresponding to a step of a process-based software application, an external service used to perform operations for the service task, and a connectors framework for facilitating using a connector to interface the service task with the external service.

FIG. 2 is a second block diagram illustrating example relationships between a service task 32 corresponding to a step of a process-based software application, one or more external services 30 used to perform operations for the service task 32, and a connectors framework 16 for facilitating using one or more connectors to interface the service task 32 with the one or more external services 30.

For the purposes of the present discussion, an external service may be any service that is not running on the same computer or group of computers as the runtime used to execute code of the process-based software application in which the service task 32 is a part. In the present example embodiment, the service task 32 is also called a process step, and it may be an activity corresponding to a BPMN flow element.

Note that the service task 32 is to request that one or more software operations be performed. Certain software operations may be performed by methods of computing resources that are accessible to the service task 32 by calling one or more external services 30.

For example, service task 32 may be tasked with obtaining the current weather for a particular zip code. The external services 30 may include an API, web service, and/or other mechanism, which expose interface(s) that the service task 32 may use retrieve the current weather data. In this example scenario, the external services 30 may be hosted on a web server of a weather data provider. The called external web services 30 may in turn call functionality of a backend application server and accompanying database to extract the weather data from the database and deliver it back to the service task 32 in response to receipt of a proper request from the service task 32.

However, when a developer develops code for the service task 32, the developer must often have detailed knowledge as to what message types can be sent to the external services 30; what protocols are used; what data formats are returned in response to a request, and so on.

Use of the connectors framework 16, as discussed herein, enables simplified and generic user interfaces for enabling developers to simply select a connector; specify an operation and/or a resource, and assign it to the service task 32. Some data mapping may also be performed. A given connector of the connectors framework may connect to different types of web services (i.e., available service types), e.g., Simple Object Access Protocol (SOAP) web services, REpresentational State Transfer (REST) APIs or services, Integration Cloud Services (ICS), or other type, depending upon the type of the connector. The term "available service types" may refer to all types of web services that are supported by a given implementation of the connectors framework and connector editors that communicate therewith.

If a connector has not yet been constructed to enable the service task 32 to connect to a particular external service 30, the connectors framework 16 also supports functionality for simplifying development and configuration of the connectors, e.g., using the connector editors 22 of FIG. 1.

In the present example embodiment, the service task 32 has been deployed, and a connector has been deployed along with the service task 32, such that the service task passes data and an operation request to the accompanying connector, which then handles interfacing of the service task with the external services 30. The handling of the interfacing may include providing security or login credentials to the service provider, so as to enable access to functionality to be provided by the called service; packaging and delivering request message payloads to the external service 30; receiving and unpacking, as needed, response messages (e.g., request results) from the external services.

Note that when the service task 32 is deployed, e.g., to a production environment, the connector(s) associated with the service task can still be configured. The connectors framework 16 provides functionality for determining the connectors associated with or installed with the service tasks, and then performing a so-called hot configuration of the running service task 32 by adjusting one or more configurable parameters of the associated connector(s), as discussed more fully below.

Figure 3:
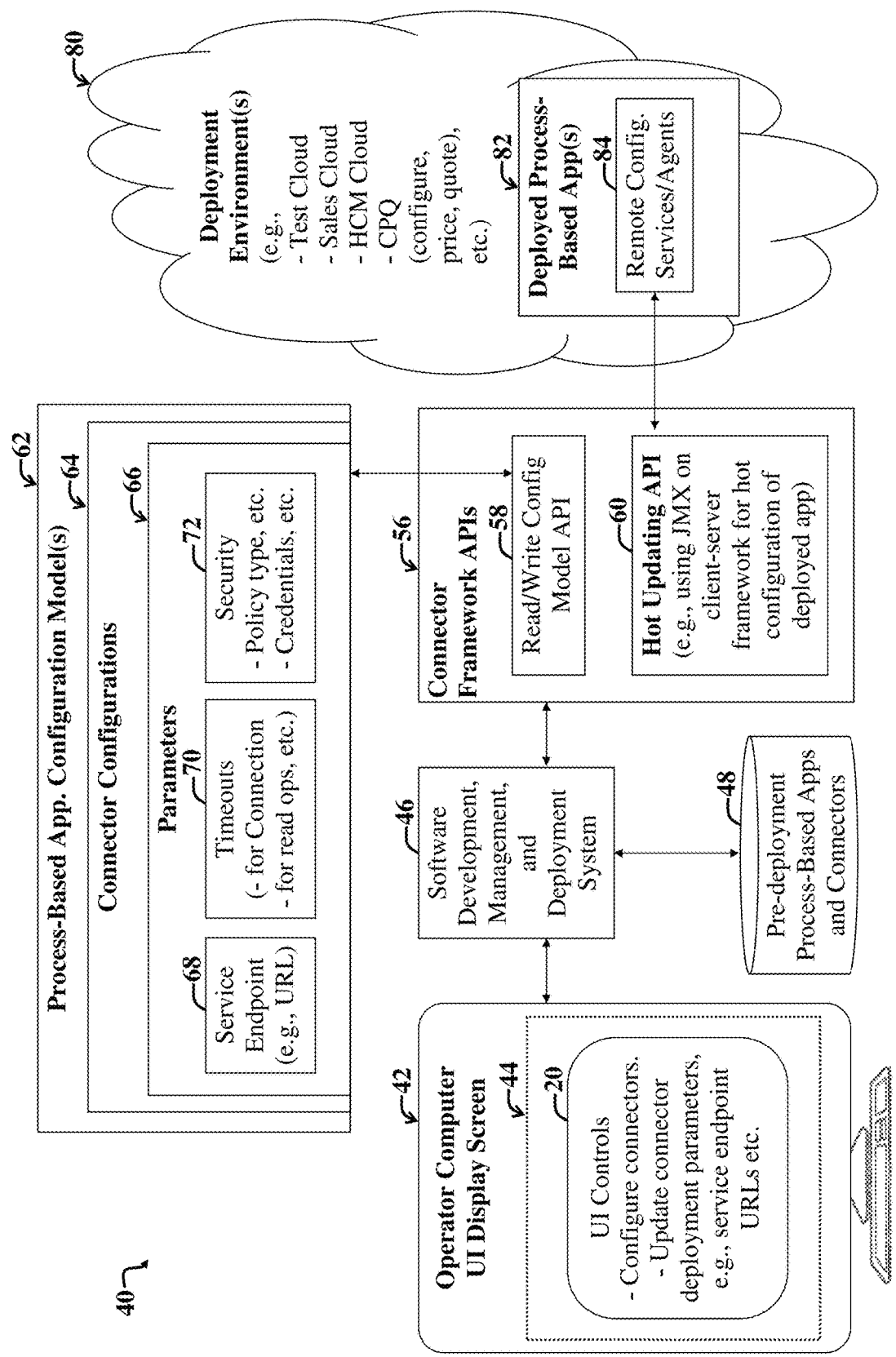
FIG. 3 is a third block diagram illustrating a second example system and accompanying computing environment, which represents an illustrative embodiment of the first example system of FIG. 1.

FIG. 3 is a third block diagram illustrating a second example system 40 and accompanying computing environment, which represents an illustrative embodiment of the first example system 10 of FIG. 1.

The system 40 includes an operator computer 42 and accompanying UI display screens and UI controls 20. The UI display screens 44 may be implemented, in part, via a browser running on the operator computer 42. The UI controls 20 may include, for example, UI controls to configure connectors; UI controls used to update connector deployment parameters, e.g., service endpoint URLs, timeout settings, security settings and credentials, certificates, etc.

In the present example embodiment, the computer system 42 is called the operator computer, as functionality afforded by the system 40 may be accessed by various authorized persons, e.g., configuration manager, deployment manager, process developer, and so on. The exact type of user of the computer system 42 may vary depending upon the needs of a given implementation.

The operation computer system 42 communicates with a server-side software development, management, and deployment system 46 and associated functionality. For the purposes of the present discussion, software functionality may be any function, capability, or feature, e.g., stored or arranged data, that is provided via computer code, i.e., software. Generally, software functionality may be accessible via use of a user interface and accompanying user interface controls and features. Software functionality (often simply called functionality herein) may include actions, such as retrieving data pertaining to a computing object (e.g., business object); performing an enterprise-related task, such as promoting, hiring, and firing enterprise personnel, placing orders, calculating analytics, launching certain dialog boxes, performing searches, and so on.

A UI display screen may be any software-generated depiction presented on a display. Examples of depictions include windows, dialog boxes, displayed tables, and any other graphical user interface features, such as user interface controls, presented to a user via software, such as a browser. A user interface display screen contained within a single border is called a view or window. Views or windows may include sections, such as sub-views or sub-windows, dialog boxes, graphs, tables, and so on. In certain cases, a user interface display screen may refer to all application windows presently displayed on a display.

A UI control may be any displayed element or component of a user interface display screen, which is adapted to enable a user to provide input, view data, and/or otherwise interact with a user interface. Additional examples of user interface controls include buttons, drop down menus, menu items, tap-and-hold functionality, and so on. Similarly, a user interface control signal may be any signal that is provided as input for software, wherein the input affects a user interface display screen and/or accompanying software application associated with the software.

The server-side software development and management functionality 46 may access one or more repositories of pre-deployment process-based software application and connectors 48. Note that when a particular process-based software application of the repository 48 is deployed, a copy of the application is actually deployed, and the original remains in the repository 48, unless of course, the original is further modified via software development functionality of the server-side system 46.

The server-side software development, management, and deployment system 46 may include various editors, e.g., the editors 22 of FIG. 1. The editors 22 included among the server-side software system 46 include one or more editors for developing connectors; configuring connectors; deploying connectors to different deployment environments 8. The various editors 22 of the server-side software system 46 may include software wizards for guiding various operator tasks through sequences of UI display screens and accompanying UI controls.

In the present example embodiment, a process-based application 82 has been deployed to a deployment environment 80, e.g., a test cloud, sales cloud, Human Capital Management (HCM) cloud, or other environment. The deployed process-based application 82 has been deployed with a remote configuration agent 84.

The remote configuration agent 84 includes computer code that enables a hot updating API 60 of a set of connector framework APIs 56 to selectively read connector configurations and update the connector configurations in response to authorized updates by an authorized user of the operator computer 42 and associated UI display screens 44 and controls 20, which may be used to access hot configuration functionality provided by the server-side software development, management, and deployment system 46.

The system 40 maintains one or more process-based application configuration modules 62 for maintaining configuration information for process-based applications, including deployed applications and associated connectors. The configuration models 62 include connector configurations, including information about various types of parameters 68-72 and their values characterizing connectors, including deployed connectors. Examples of configurable information that may be stored among the configuration models for a particular connector include service endpoint parameters 68, timeout parameters 70, security parameters 72 (e.g., security policy type, credentials, etc.).

One or more read/write configuration model APIs 58 are supported among the connector framework APIs 56, and they are usable to read configuration information from the models 62 and to write updated configuration information (e.g., represented by the parameters 66) to the models 62, as needed to keep an accurate record of configuration changes made to process-based software applications and accompanying connectors, despite whether they are deployed in a test environment, production environment, or other deployment environment.

Note that the connector framework APIs 56 may be part of the connectors framework 16 of FIG. 1. Furthermore, the hot updating API 60 and accompanying hot updating functionality may be implemented via Web Logic Server (WLS) API that leverages Java Management eXtensions (JMX) as part of deployment manager functionality of the configuration functions 54.

In summary, a deployment manager may use the operator computer 42 and accompanying UI display screens 44 to log into the server-side software system 46. The deployment manager may be tasked with configuring certain aspects of an application before its deployment accordingly to the purpose of the execution platform. This type of configuration is called pre-deployment configuration. Configuration changes may also be made after deployment, i.e., configurations changes to deployed applications can be made during execution (which is called hot updating herein). This type of configuration performed for an executing application is called post-deployment configuration.

The server-side software system 46 and accompanying connector framework APIs 56 facilitate easy replacement of connector endpoints (and other configuration data), which enables developers, managers, etc., to readily mock up servers to test the applications and associated connectors before deployment. Testing can be done using a copy of the process-based software application (e.g., as may be represented by a BPMN model). If the application passes tests, it is then deployed.

At deployment time, a copy of the application to be deployed may be extracted from the repository 48 by server-side software system 46. The copy of the application may then be deployed to a test environment, wherein configurations can be changed while the application is running. After any adjustments during testing, the updated system can be deployed to a target environment, e.g., as represented by the deployed process-based application 82 of FIG. 3.

Note that in general, the hot updating APIs 60 and the read/write configuration model APIs 58 of the connector framework APIs are used by a particular type of user, i.e., a deployment manager. The system 40 illustrates key functional blocks 46-84 that may assist a deployment manager in deploying and/or configuring process-based applications and their associated connectors when deployed to particular environments.

Note that the purposes of a particular execution platform are implementation specific, but can include test platforms used to mockup and test target services, credentials, execution parameters, and so on, that are referred to in a corresponding production platform.

In an example scenario, a deployment manager uses the operator computer 42 to access the server-side software system 46. The deployment manager is responsible for the pre-deployment configuration of certain aspects of an application before its deployment accordingly to the purpose of the execution platform.

The deployment manager may also be responsible for post-deployment configuration involving hot updating application and connector configurations for deployed applications during their execution (hot).

To facilitate implementing pre-deployment and post-deployment configuration, certain tasks are performed in sequence. Initially, for pre-deployment configurations, the deployment manager and accompanying software tools 46-72 may be tasked with determining relevant configuration points of a process-based software application (also simply called "application" herein) and associated connectors; extracting the current values of a configuration point from an application; capturing the changes performed for each configuration point; optionally retaining configuration information for its typification and posterior reuse; applying a configuration to a new copy of an application, while keeping the original untouched; deploying the copy of the application to the execution platform; and configuring the execution platform in preparation for deployment of the application.

To facilitate pre-deployment configurations, the configuration model(s) 62 (which may represent memory representations of one or more configurations) are usable to facilitate handling and coordinating various configuration-related activities, as discussed more fully below. Furthermore, the model can be read and written to, e.g., via the read/write configuration model API 58. Furthermore, in certain embodiments, the model 62 may write to and read from itself, e.g., by calling different APIs and frameworks in a particular order.

Various aspects of the configuration model(s) 62 are user modifiable pre-deployment, including service endpoint information 68, service connection and read timeouts; and security configurations.

Note that user access to and manipulation of the various parameters 68-72 may involve use of different APIs and procedures. For example, information about the service endpoint 68 may not necessarily already be in a configuration file, e.g., but may instead be in, for example, a WSDL (Web Services Description Language) schema descriptor file. An API may be used to read and update the schema for a particular connector.

Note that timeout data 70 may be stored in another descriptor file, e.g., called composite.xml, where the exposed services and references to external services are declared. Another API can be used to gather such data for storage in the configuration model 62 for a particular connector.

Maintaining security information 72 in the configuration model 62 may involve collection of security attributes. This may include specifying the security policy. This can be done, for example, in a wsm-assembly.xml file. Another API can be used to read/write to a copy of or other memory representation of the wsm-assembly.xml file. While such security configuration information may tell the runtime engine what security the service will use and what credentials to use, the credentials may be stored separately, for example, in a Web Logic (WL) credential store.

The credential store may be selectively updated. For example, the wsm-assmebly.xml declares what credentials should be used to connect to a service. However, the credentials themselves are stored in the credential store, where they are encrypted and protected only to those with the right access. To facilitate usability, the credential store may be maintained with the required data. A pre-deployment configuration form may enable a user to enter username, password, key, and/or other credentials. These credentials can help ensure that the files point to an associated key, which can be updated in the credentials store as needed. One or more additional APIs may be used to facilitate such certificate handling.

For post-deployment configuration, the application to be deployed is configured while it is running on the execution platform. The hot updating APIs 60 facilitate use of JMX to access configuration information from running process-based application(s) 82.

Figure 4:
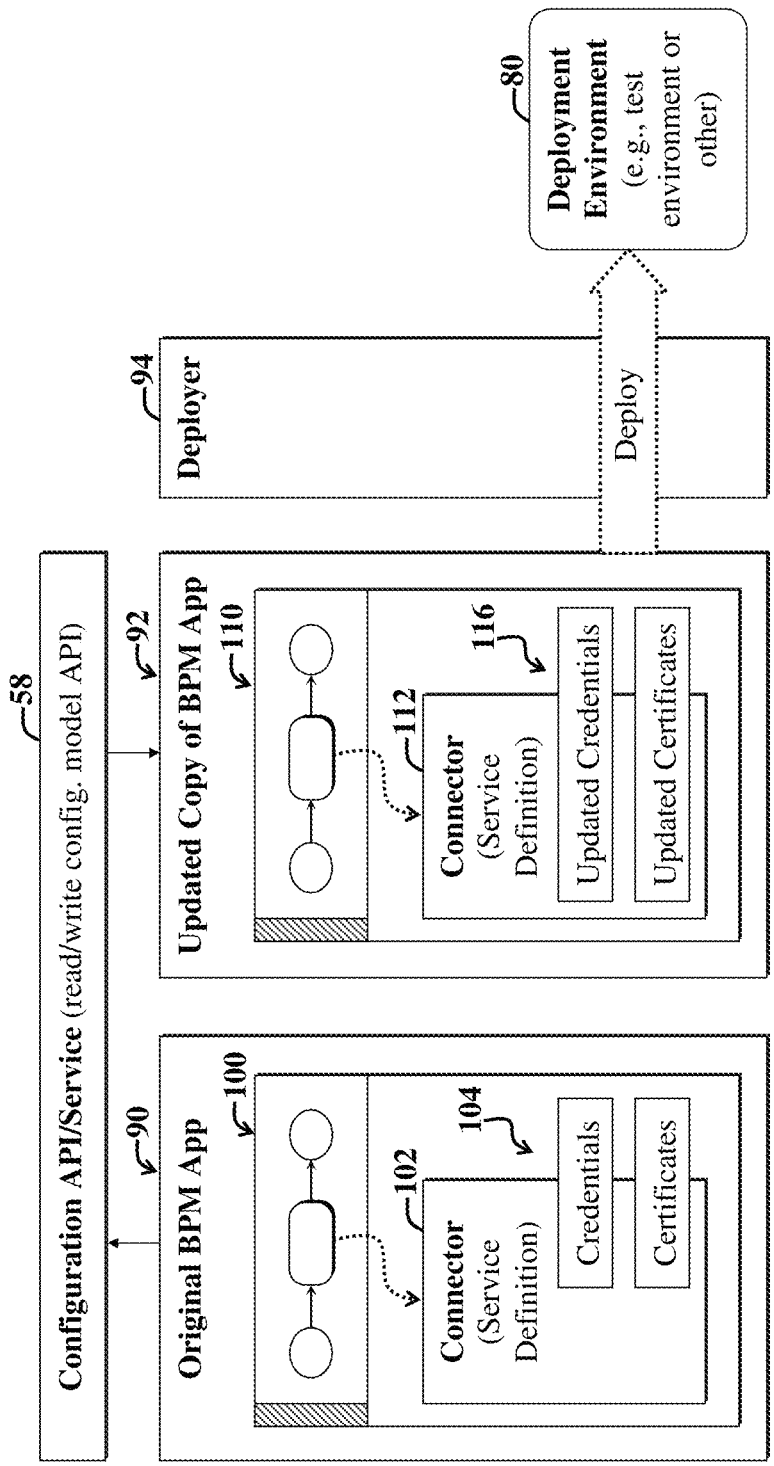
FIG. 4 is a fourth block diagram illustrating use of the configuration service or API of FIG. 3 to update connector configurations for a process-based software application before deployment of a configured copy (of the original process-based software application and associated connector configurations) to a deployment environment.

FIG. 4 is a fourth block diagram illustrating use of the configuration service or API 58 of FIG. 3 to update connector configurations for a process-based software application 90 before deployment of a configured copy (of the original process-based software application and associated connector configurations) 92 to a deployment environment 80.

Note that the original process-based software application (also called a Business Process Model (BPM) application herein) 90 is shown including an example model 100 with a process step that is associated with a connector 102, which is in turn associated with various configuration parameters 104. The original BPM application 90 may be input to the configuration API or service 58, which then may update the configuration parameters 104 and provide a copy of the updated BPM application 92 with adjusted connector credentials and an adjusted connector 112.

The updated copy of the BPM application 92 may then be passed through a deployer 94 (e.g., as may be implemented via server-side software system 46 of FIG. 3), which then deploys the updated copy of the BPM application 92 to the deployment environment 80.

Figure 5:
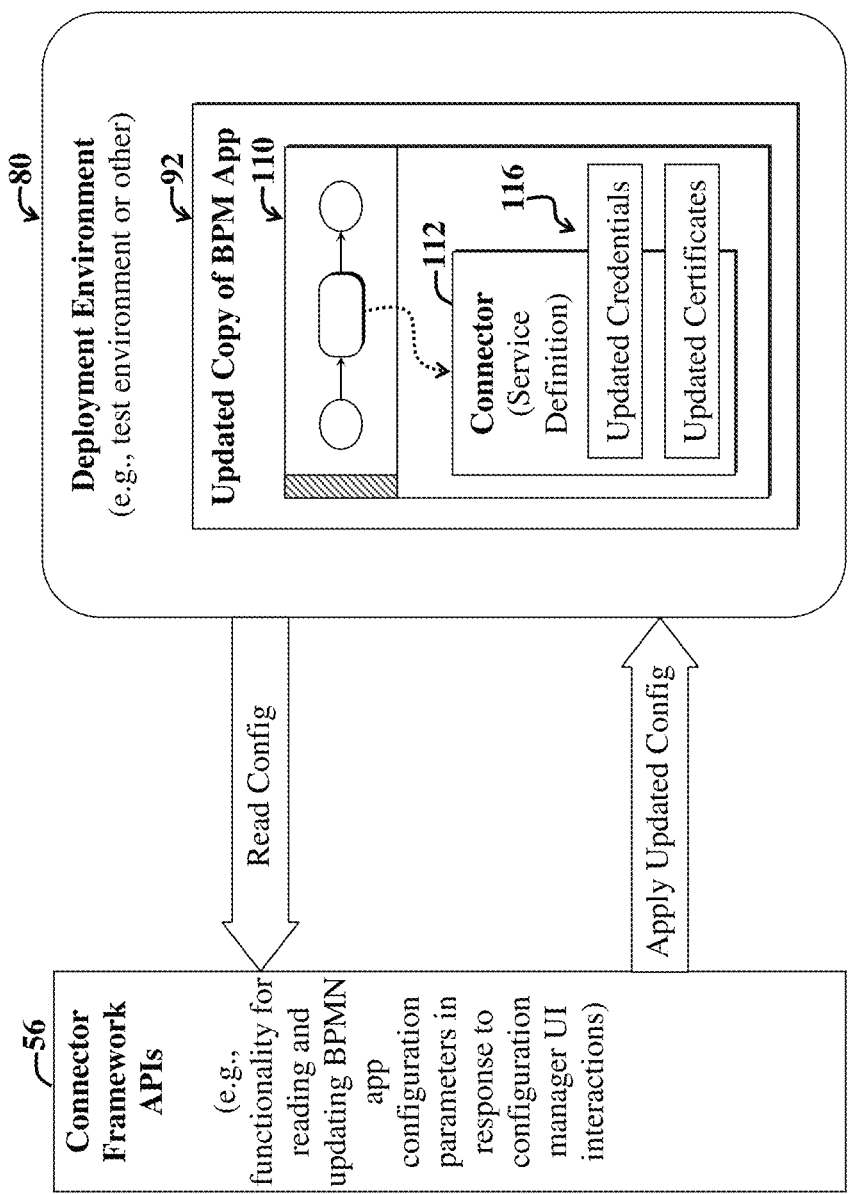
FIG. 5 is a fifth block diagram illustrating use of a hot updating API included in the connectors framework API of FIG. 3 to update a process-based software application and associated connector configurations while the process-based software application is running in the deployment environment.

FIG. 5 is a fifth block diagram illustrating use of a hot updating API 56 included in the connectors framework API 56 of FIG. 3 to update a process-based software application 92 and associated connector configurations 116 while the process-based software application 92 is running in the deployment environment 80.

The connector framework APIs 56 read the configuration information from the running BPM application 92; accepts any valid adjustments made by an authorized user of the server-side software system 46 of FIG. 3, and applies the updated configuration information 16 to the running BPM application 92.

As discussed with reference to FIG. 4, the hot updating operations may involve use of a remote configuration agent and/or service 84 and a hot updating API using JMX technology and running among the connector framework APIs 56.

Figure 6:
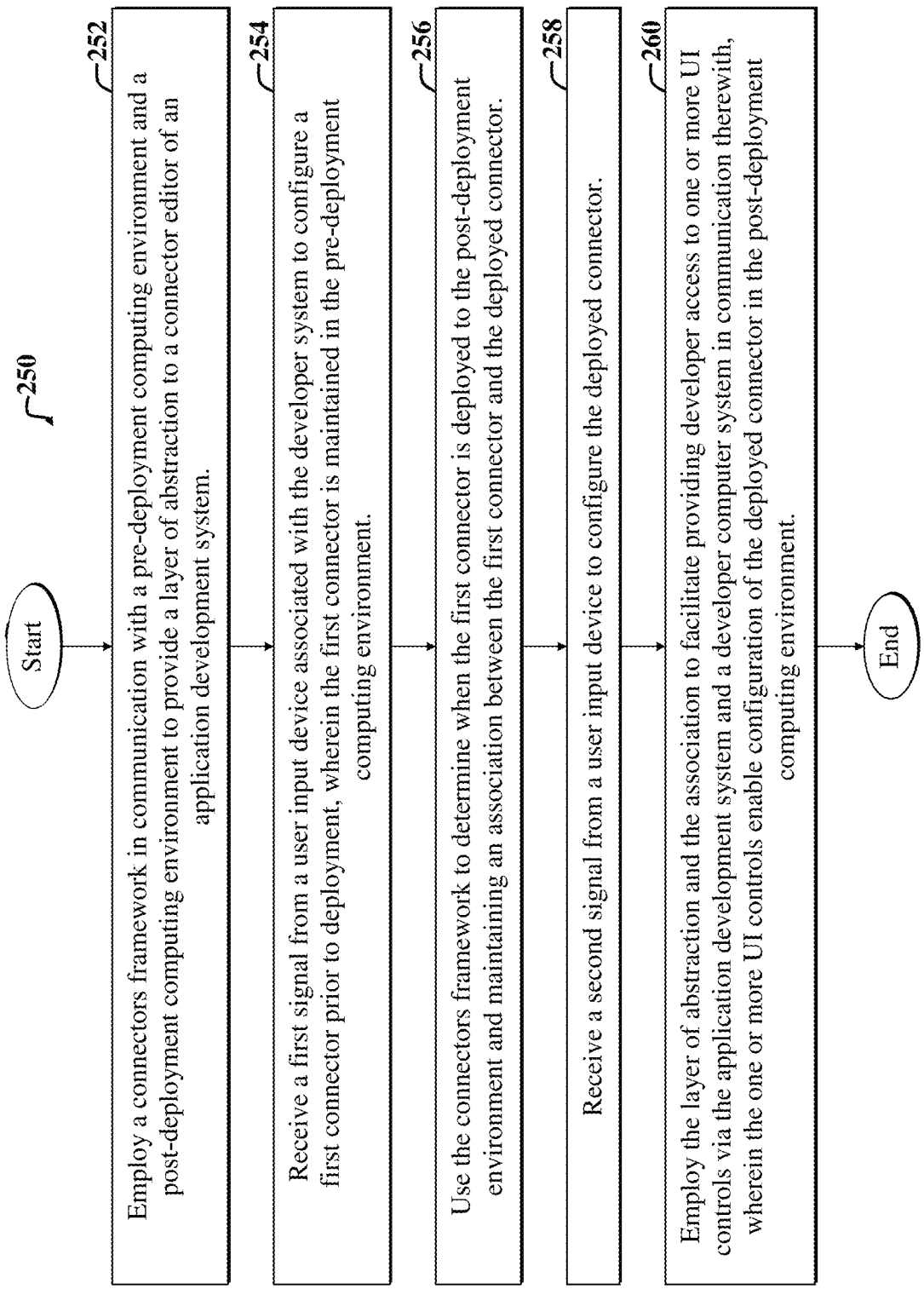
FIG. 6 is a flow diagram of a first example method implementable via the embodiments of FIG. 1-5.

FIG. 6 is a flow diagram of an example method 250 that is implementable via the embodiments of FIGS. 1-5. The example method 250 enables developers or other users to readily configure a software connector for interfacing different resources of a computing environment.

The example method 250 includes a first step 252, which involves employing a connectors framework (e.g., the framework 16 of FIG. 1 and accompanying framework APIs 56 of FIG. 3) in communication with a pre-deployment computing environment and a post-deployment computing environment to provide a layer of abstraction to a connector editor (e.g., editor 22 of FIG. 1) of an application development system (e.g., development system 14 of FIG. 1, and server-side software system 46 of FIG. 3).

A second step 254 includes receiving a first signal from a user input device (e.g., client-side systems 12, 42 of FIGS. 1 and 3) associated with the developer (or other operator, e.g., deployment or configuration manager) system to configure a first connector prior to deployment, wherein the first connector is maintained in the pre-deployment computing environment.

A third step 256 includes using the connectors framework to determine when the first connector is deployed to the post-deployment environment, and maintaining an association between the first connector and the deployed connector.

A fourth step 258 includes receiving a second signal from a user input device to configure the deployed connector.

A fifth step 60 includes employing the layer of abstraction and the association to facilitate providing developer access to one or more UI controls via the application development system and a developer computer system in communication therewith, wherein the one or more UI controls enable configuration of the deployed connector in the post-deployment computing environment.

Note that the method 250 may be altered, without departing from the scope of the present teachings. For example, the method 250 may further specify using the connectors framework to automatically parameterize the first connector with different data depending upon whether the fist connector is in a pre-deployment computing environment or represents a deployed connector in a post-deployment computing environment.

The application development system may include a connector editor accessible to a developer computer via a browser. The connector editor may include code for rendering one or more UI display screens on the developer computer system. The one or more UI display screens may include the one or more UI controls. The one or more UI controls may further provide one or more developer options to change connection configurations for a particular connector before and after deployment, in the pre-deployment computing environment and the post-deployment computing environment, respectively.

Figure 7:
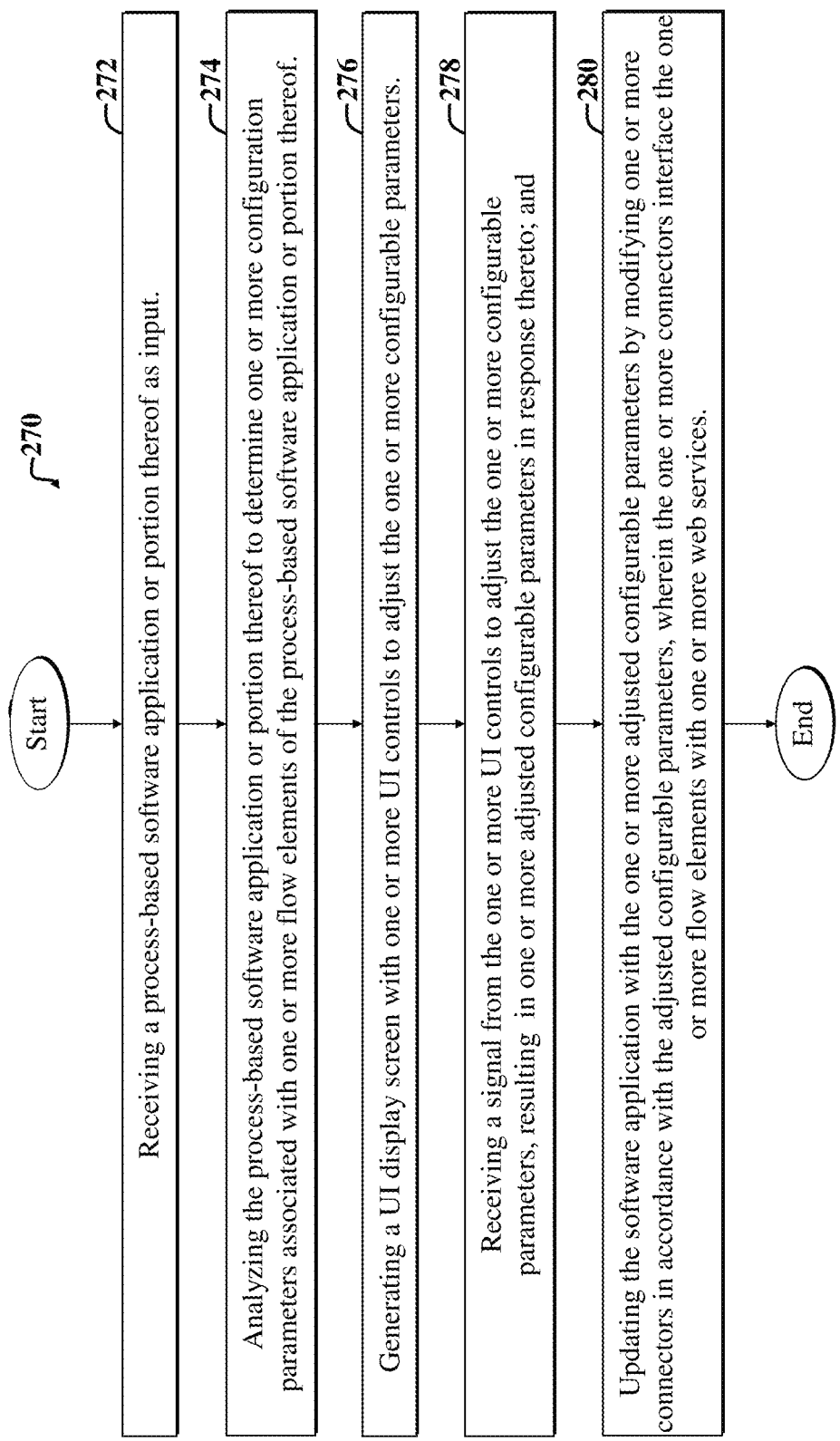
FIG. 7 is a flow diagram of a second example method implementable via the embodiments of FIGS. 1-5.

FIG. 7 is a flow diagram of a second example method 270 implementable via the embodiments of FIGS. 1-5.

The second example method 270 includes a first step 272, which involves receiving a process-based software application or portion thereof as input (e.g., to the connector framework APIs 56 of FIG. 3 and/or configuration service 58 of FIG. 4).

A second step 274 includes analyzing the application to determine one or more configuration parameters associated with one or more flow elements of the process-based software application (set of configuration points).

A third step 276 includes generating a UI display screen with one or more UI controls to adjust the one or more configurable parameters.

A fourth step 278 includes receiving a signal from the one or more UI controls to adjust the one or more configurable parameters, resulting in one or more adjusted configurable parameters in response thereto.

Finally, a fifth step 280 includes updating the software application with the one or more adjusted configurable parameters by modifying one or more connectors in accordance with the adjusted configurable parameters, wherein the one or more connectors interface the one or more flow elements with one or more web services.

Note that the method 270 may be modified, without departing from the scope of the present teachings. For example, the second step 274 may further include analyzing a copy of the process-based software application prior to deployment of the copy of the process-based software application to a target execution platform and associated computing environment.

When the analyzing occurs after deployment of a copy of the software application to a particular execution platform, the method 270 may further specify use of JMX to facilitate hot configuration of the software application, which has been deployed to the particular execution platform.

The second example method 270 may further specify that the configuration parameters conform to a configuration model (e.g., the model 62 of FIG. 3). One or more APIs (e.g., the API 58 of FIG. 3) may enable writing to and reading from the model.

The one or more configuration parameters include an identification of a service endpoint. The identification of a service endpoint may include a Uniform Resource Identifier (URI) or URL specifying a network address associated with the service endpoint.

The second example method 270 may further include providing a first UI control to enable user adjustment to the URI. The one or more configuration parameters include one or more time out values for a service connection. The one or more configuration parameters may include one or more time out values for a read operation performed by the service endpoint. The one or more configuration parameters may further include one or more security parameters. The one or more security parameters may further include an indication of a type of security (security policy) to be used to access the endpoint. The one or more security parameters may further include one or more login credentials used to access the service endpoint.

Figure 8:
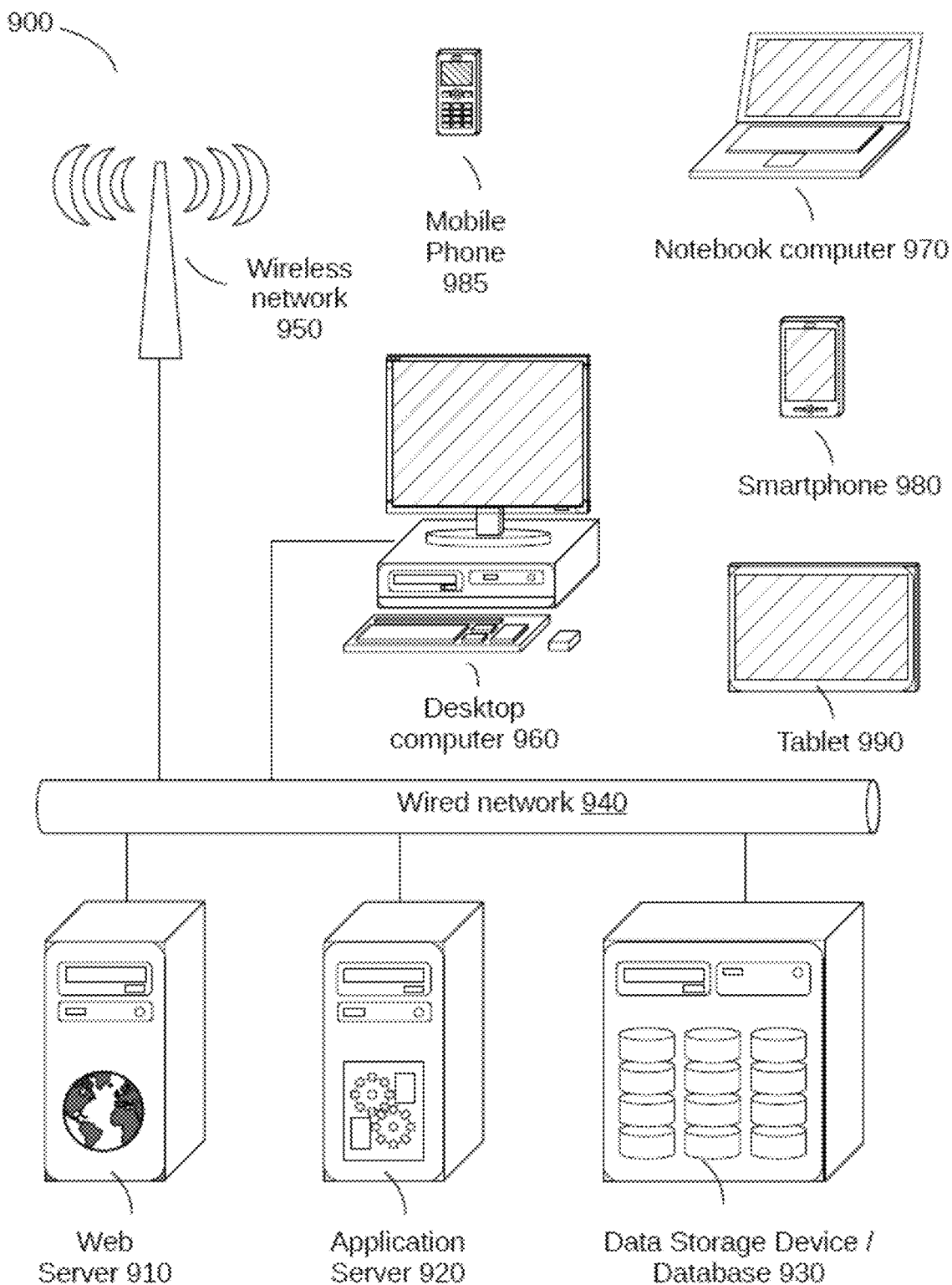
FIG. 8 is a general block diagram of a system and accompanying computing environment usable to implement the embodiments of FIGS. 1-6.

FIG. 8 is a general block diagram of a system 900 and accompanying computing environment usable to implement the embodiments of FIGS. 1-7. The example system 900 is capable of supporting or running various hardware and/or software modules and associated methods discussed with reference to FIGS. 1-7. Note that certain embodiments may be implemented using one or more standalone applications (for example, residing in a user device) and/or one or more web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as Rich Site Summary (RSS) feeds of data related to enterprise operations.

An application server 920 operates one or more applications. The applications can be implemented as one or more scripts or programs written in any programming language, such as Java, C, C++, C #, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computer.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system 900 is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1 and 8, the client system 12 of FIG. 1 and system 42 of FIG. 3 may be implemented in whole or in part via one or more of the desktop computer 960, notebook computer 970, smartphone 980, mobile phone 985, tablet 990, and/or other computing devices. The computing devices 960-990 may run browsers, e.g., the browser 12 of FIG. 12.

Browsers running on the client systems 12 and 42 of FIGS. 1 and 3 may employ a network, such as the Internet (corresponding to the wired network 940, and optionally, the wireless network 950 of FIG. 8) to browse to one or more URLs corresponding to websites and associated web applications 14, 22 of FIG. 1 to access, use, and/or otherwise manipulate data and functionality thereof.

Note that generally, the enterprise server system used to implement the modules 14-18, 22-26 of FIG. 1 may be implemented via one or more of the servers 910, 920 of FIG. 8. Similarly, certain databases, e.g., the pre-deployment process-based applications and connectors 48 may include database management systems that run on application servers, e.g., one or more of the application servers 920, which in turn manage stored data that has been stored via one or more data storage devices 930 of FIG. 8. The data storage devices 930 and/or databases 930 are accessible to the servers 910, 920 via the wired network 940.

More specifically, the application development systems 14, accompanying editors 11, connectors framework 16 and associated deployed connectors 26 and pre-deployment connectors 18 may run on one or more web servers one or more web servers, as represented by the web server 910 of FIG. 8.

Alternatively, or in addition, the modules 14-18, 22-26 of FIG. 1 may run on an application server 920, which communicates with web page code running on the web server 910, e.g., via one or more web services and/or APIs. The web page code is accessible via one or more websites that may be browsed to via the client systems 12 and 42 of FIGS. 1 and 3.

Similarly, the deployed process-based applications 82 of FIG. 3 may be deployed to one or more clouds that include one or more web servers and/or application servers corresponding to the web server 910 and application server 920 of FIG. 8, respectively. In general, distributed software applications, which may call disparate services and utilize computing resources that are distributed across a particular cloud or even across the Internet, may have components that run on different types of servers, e.g., web servers 910, application servers 920, and/or a combination thereof.

Furthermore, note that various embodiments discussed here may provide substantial benefits to software applications, e.g., by facilitating configuration of process-based software applications for different computing environments for both prior to deployment and after deployment. Such configurability and connector reuse if facilitated in part by the nature of the connectors, which act as abstractions that handle behind-the-scenes complexities, so that users and interfacing systems alike experience simplified interfaces and interactions.

Figure 9:
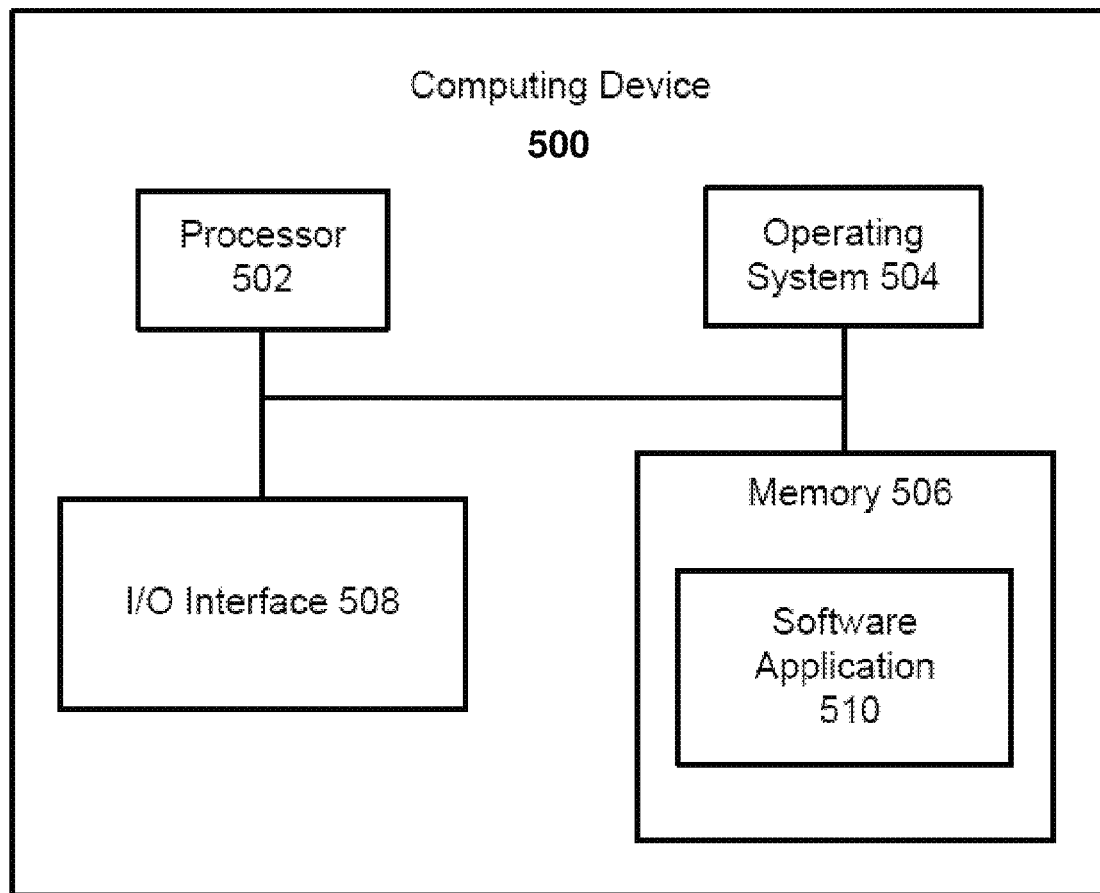
FIG. 9 is a general block diagram of a computing device usable to implement the embodiments of FIGS. 1-8.

FIG. 9 is a general block diagram of a computing device 500 usable to implement the embodiments described herein. While the computing device 500 of FIG. 9 may be described as performing one or more of the steps in the embodiments herein. In other embodiments, any suitable component or combination of components of the computing device 500 or any suitable processor or processors associated with system 500 may facilitate performing the steps.

FIG. 9 illustrates a block diagram of an example computing system 500, which may be used for implementations described herein. For example, computing system 500 may be used to implement server devices 910, 920 of FIG. 8 as well as to perform the method implementations described herein.

In some implementations, computing system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing system 500 may be implemented by one or more processors or any combination of hardware devices, as well as any combination of hardware, software, firmware, etc.

For ease of illustration, FIG. 9 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

Although the description has been described with respect to particular embodiments thereof, these particular embodiments are merely illustrative, and not restrictive. For example, while various embodiments discussed herein address use of tokens to facilitate data access by a software application, embodiments are not limited to mere data access. For example, embodiments may employ use of tokens as discussed herein to facilitate writing data to a data store and/or accessing software functionality provided by the data store and/or provided by another software application that is configured to enable access to data and/or functionality in response to the supplying of credentials.

Note that embodiments for enabling access to functionality may readily be adapted and used with embodiments discussed therein that leverage an intermediate secure connector to selectively retrieve authentication information, e.g., account credentials, from a secure data store, in response to a supplied (by a software application) token or token name, to thereby enable access to the data and/or functionality by another software application, without departing from the scope of the present teachings.

Furthermore, while various embodiments are discussed herein within the context of cloud-based enterprise applications and third party web applications, embodiments are not limited thereto. Other types of applications and associated sessions may employ methods discussed herein to facilitate confidential data and/or functionality sharing, without departing from the scope of the present teachings.

Although the description has been described with respect to particular embodiments thereof, these particular embodiments are merely illustrative, and not restrictive. For example, while various embodiments are discussed herein within the context of cloud-based enterprise applications and third party web applications, embodiments are not limited thereto. Other types of development environments, deployment environments, and associated applications may employ methods discussed herein to facilitate creation, use of, and configuration of connectors by software application deployed in different computing environments and tasked with making calls to external APIs and/or web services, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer readable medium including instructions executable by one or more processors for:
   determining a first configuration of a connector prior to deployment to a post-deployment computing environment associated with development of a process-based software program;
   maintaining an association between the connector and a pre-deployment computing environment, wherein the association is configured to maintain user access to configure the connector in a deployed state;
   detecting when a connector is deployed to a post-deployment computing environment and placed in the deployed state;
   determining whether the connector in the deployed state requires configuration updates to the first configuration; and
   if the connector requires configuration updates to the first configuration then configuring the association to provide the configuration updates to the connector in order to update the connector while in the deployed state from the first configuration to a second configuration.

2. The non-transitory computer readable medium of claim 1, wherein the connector retains at least some configuration information for typification of the connector.

3. The non-transitory computer readable medium of claim 1, wherein the connector retains at least some configuration information for its posterior use.

4. The non-transitory computer readable medium of claim 1, wherein the association exposes user access to one or more User Interface (UI) controls.

5. The non-transitory computer readable medium of claim 4, wherein determining a first configuration further comprises parameterizing the connector with a first set of data specific to the pre-deployment computing environment.

6. The non-transitory computer readable medium of claim 1, wherein determining whether the connector in the deployed state requires configuration updates further comprises parameterizing the connector with a second set of data specific to the post-deployment computing environment.

7. The non-transitory computer readable medium of claim 6, wherein detecting when the connector is deployed further comprises configuring a connectors framework to detect when the connector is deployed.

8. The non-transitory computer readable medium of claim 7, wherein the connectors framework implements functionality for generalizing and reducing exposed complexity between UI controls employed in the pre-deployment computing environment with external services that are to be called by the process-based software program.

9. The non-transitory computer readable medium of claim 1, further comprising applying the configuration updates to the connector during an execution of a deployed version of the process-based software program employing the connector.

10. The non-transitory computer readable medium of claim 9, wherein supplying the configuration updates comprises supplying the configuration updates using a hot update process.

11. A method for facilitating configuring a software connector for interfacing different resources of a computing environment, the method comprising:
   determining a first configuration of a connector prior to deployment to a post-deployment computing environment associated with development of a process-based software program;
   maintaining an association between the connector and a pre-deployment computing environment, wherein the association is configured to maintain user access to configure the connector in a deployed state;
   detecting when a connector is deployed to a post-deployment computing environment and placed in the deployed state;
   determining whether the connector in the deployed state requires configuration updates to the first configuration; and
   if the connector requires configuration updates to the first configuration then configuring the association to provide the configuration updates to the connector in order to update the connector while in the deployed state from the first configuration to a second configuration.

12. The method of claim 11, wherein the connector retains at least some configuration information for typification of the connector.

13. The method of claim 11, wherein the connector retains at least some configuration information for its posterior use.

14. The method of claim 11, wherein the association exposes user access to one or more User Interface (UI) controls.

15. The method of claim 14, wherein determining a first configuration further comprises parameterizing the connector with a first set of data specific to the pre-deployment computing environment.

16. The method of claim 11, wherein determining whether the connector in the deployed state requires configuration updates further comprises parameterizing the connector with a second set of data specific to the post-deployment computing environment.

17. The method of claim 16, wherein detecting when the connector is deployed further comprises configuring a connectors framework to detect when the connector is deployed.

18. The method of claim 17, wherein the connectors framework implements functionality for generalizing and reducing exposed complexity between UI controls employed in the pre-deployment computing environment with external services that are to be called by the process-based software program.

19. The method of claim 18, further comprising applying the configuration updates to the connector during an execution of a deployed version of the process-based software program employing the connector.

20. An apparatus for facilitating configuring a software connector for interfacing different resources of a computing environment, the apparatus comprising:
   one or more processors;
   a tangible processor-readable storage device including instructions for:
   determining a first configuration of a connector prior to deployment to a post-deployment computing environment associated with development of a process-based software program;
   maintaining an association between the connector and a pre-deployment computing environment, wherein the association is configured to maintain user access to configure the connector in a deployed state;
   detecting when a connector is deployed to a post-deployment computing environment and placed in the deployed state;
   determining whether the connector in the deployed state requires configuration updates to the first configuration; and
   if the connector requires configuration updates to the first configuration then configuring the association to provide the configuration updates to the connector in order to update the connector while in the deployed state from the first configuration to a second configuration.

* * * * *